UNITED STATES PATENT OFFICE 2,508,022

METHOD OF PREPARING AROMATIC DICARBOXYLIC ACIDS

Earl W. Gluesenkamp, Centerville, Ohio, assignor to Monsanto Chemical Company, St. Louis, Mo., a corporation of Delaware No Drawing. Application May 27, 1948, Serial No. 29,647

4 Claims. (Cl. 260—515)

This invention relates to a new and valuable process for the preparation of aromatic dicarboxylic acids. More particularly the invention relates to methods of preparing terephthalic acid and the biphenyldicarboxylic acids by means of the Grignard synthesis.

The Grignard reaction is a well known method of organic chemical synthesis whereby an organic compound containing a halogen atom is reacted with magnesium to form an organic magnesium halide, RMgX which is then combined with a reactive compound, such as a ketone, aldehyde, or another carbonyl containing compound in accordance with the following reaction:

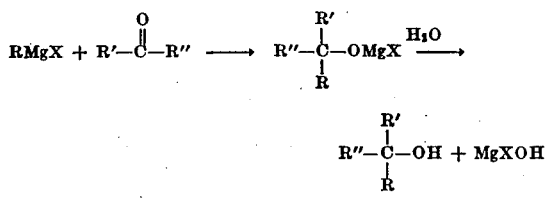

Organic synthesis involving Grignard reagents is subject to inherent limitations which restrict its industrial application. For example, the cost of the reactive bromides and iodides are generally prohibitive, whereas the available low cost chlorides are not readily reactive. Furthermore Grignard reactions involving the arylhalides, and especially arylchlorides, are difficult to practice. A high pressure technique has been developed for the utilization of chlorides but difunctional Grignard reagents cannot be prepared because only one of the two available chlorine atoms of an arylene dichloride is active under those conditions.

The primary purpose of this invention is to provide a modified Grignard synthesis involving difunctional aromatic magnesium halides. A further purpose of this invention is to provide a new process for preparing very valuable terephthalic acid at an unusually low cost, and of high purity. Further purposes are to provide useful methods for the synthesis of various aromatic polycarboxylic acids.

In U. S. Patent 2,416,717, there are described and claimed mechanical methods of expediting chemical reactions involving a metal surface, by cutting the metal in the presence of the reactive agent, and thereby furnishing a fresh and untarnished metallic surface for reaction. The high temperature at the cutting edge, the high pressure of the cutting tool and/or the strained condition of the metal may influence the reaction, but regardless of the mechanism involved an improved reaction rate is achieved.

It has now been discovered that the mechanical activation method is useful not merely in expediting Grignard reactions, but also in achieving a very different result the formation of difunctional aromatic magnesium chlorides. The resulting dispersion of such compounds are converted by carbonation to compounds having the structure:

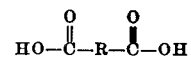

wherein R is an arylene radical, such as phenylene, naphthalene, diphenylene and anthracene radicals. Thus dibasic acids are prepared, for example: phthalic acid, terephthalic acid, isophthalic acid, 4,4'-diphenylenedicarboxylic acids, other diphenylene acids, the naphthalenedicarboxylic acids and the dibasic acids having more than two benzene rings.

Although aromatic Grignard compounds can be prepared by conventional methods from the corresponding bromides, the preparation of the analogous chlorides can only be effected through the use of high pressure autoclaves or other similarly complex equipment. Furthermore, the aromatic diGrignard chlorides have not heretofore been prepared and the second chloride radical of aromatic dichlorides has been regarded as nonreactive with magnesium. In accordance with this invention the aromatic dichlorides in solution in a suitable solvent are contacted with freshly exposed magnesium surfaces, continuously prepared within the reactor. Preferably the cutting operation is conducted below the surface of the reaction solution, whereby the aromatic dichlorides are immediately contacted with the magnesium in very reactive condition at elevated temperatures induced by the cutting tool.

If desired the operation may be conducted continuously by introducing a stream of the dichloride into the reaction vessel, and the product withdrawn continuously in a concentration which can be regulated by the rate of flow of reagent through the reaction vessel. The reaction vessel may comprise a container in which a rigidly supported cutting tool is mounted and into which a rotating bar of magnesium is thrust in such a manner that a thin shaving or series of chips is produced, and the advancing bar of magnesium is completely utilized. The invention may be practiced by a wide variety of structures, wherein the fresh surface of magnesium is exposed to the reactive solution by the continuous action of a cutting tool.

In the batchwise operation of the process difficulty in initiating the reaction may be encountered which is customary in Grignard reagent preparations. This difficulty is minimized by continuous operation, under which circumstances there is at all times Grignard reagents present in the reaction to catalyze further reaction. The initiation of either the batch or the continuous operation may be effected by the introduction of a small amount of previously prepared Grignard reagent or by the presence of a more reactive Grignard forming material, such as alkyl bromide or an alkyl iodide. Elemental bromide or iodine will also initiate the reaction. Once the reaction is initiated it will proceed spontaneously without the introduction of materials which would otherwise add impurities or diluents to the product. In either the continuous or the batchwise process the Grignard reagents may be processed without separation or purification. The preparation of aromatic di-Grignard reagents involves also the formation of a small concentration of a compound having only one of its two chlorine substituents reacted with the magnesium. This mono-Grignard compound is difficult to separate in the intermediate stage but its reaction products can be separated quite conveniently after further processing.

The effluent solution from the Grignard reaction is reacted with carbon dioxide, in gaseous or solid form, which converts the Grignard reagents to carboxylic acids. The diGrignard compounds are thereby converted into the desired aromatic dicarboxylic acids and the monochloro mono-Grignard compounds are converted into the monochloro monocarboxylic acids and are thereafter conveniently separated by physical methods, for example crystallization or by washing with suitable solvents. The dicarboxylic acids may be prepared in any desired purity and may be used for any of their many well known applications.

Further details of the preparation of these compounds are set forth with respect to the following specific example.

Example

Sixty-eight grams of 4,4'-dichlorobiphenyl was dissolved in 600 cc. of ethylene glycol diethyl ether and placed in an apparatus equipped with a device continuously shaving a bar of magnesium below the surface of the liquid. Then a bar of magnesium was slowly introduced into the reactor with continuous shaving of the surface. The resulting slurry of the diGrignard reagent was transferred to another flask and treated with an excess of gaseous carbon dioxide with vigorous stirring and cooling. The product was then hydrolyzed with a dilute solution of sulfuric acid. Sixty grams of crude precipitated acids were obtained by filtration, washing and drying. This material was dissolved in a hot solution of alkali, filtered from some insoluble residue, and reprecipitated with sulfuric acid. The reprecipitated acid was identified as biphenyl-4,4'-dicarboxylic acid.

Although the invention has been described with respect to specific embodiments, it is not intended that the details thereof shall be construed as limitations upon the scope of the invention except to the extent incorporated in the following claims.

I claim:

1. The method of preparing aromatic dicarboxylic acids which comprises cutting metallic magnesium to expose continuously fresh surface areas to an anhydrous solution of an arylene dichloride to form the arylene-bis(magnesium chloride) derivative, contacting said derivative with carbon dioxide, and separating the resulting dicarboxylic acid.

2. The method of preparing terephthalic acid which comprises continuously cutting metallic magnesium to expose fresh surfaces thereof to an anhydrous solution of para-dichlorbenzene to form p-phenylene-bis(magnesium chloride), contacting the compound so formed with carbon dioxide, and separating the resulting terephthalic acid.

3. The method of preparing 4,4'-biphenylenedicarboxylic acid which comprises continuously cutting metallic magnesium to expose fresh surfaces thereof to an anhydrous solution of 4,4'-dichlorobiphenyl to form the diphenylene-4,4'-bis(magnesium chloride), contacting the compound thus formed with carbon dioxide and separating the resulting 4,4'-diphenylenedicarboxylic acid.

4. The method of preparing isophthalic acid which comprises continuously cutting metallic magnesium to expose fresh surfaces thereof to an anhydrous solution of meta-dichlorbenzene to form m-phenylene-bis(magnesium chloride), contacting the compound so formed with carbon dioxide, and separating the resulting isophthalic acid.

EARL W. GLUESENKAMP.

REFERENCES CITED

The following references are of record in the file of this patent:

UNITED STATES PATENTS

| Number | Name | Date |
|---|---|---|
| 2,416,717 | Shaw | Mar. 4, 1947 |

OTHER REFERENCES

Gilman et al., Bull. soc. Chim (de France), vol. 45, pp. 344–349 (1929).

Gilman et al., Rec. Trav. Chim (Pays-Bas), vol. 48, pp. 597–602 (1929).

St. John et al., Rec. Trav. Chim. (Pays-Bas), vol. 55, pp. 585–588 (1936).

Gilman, "Org. Chemistry-Advanced Treatise," vol. 1 (John Wiley, 1938), page 422.